3,795,716
BLENDED TRANS-PIPERYLENE AND MALEIC
ACID ADDUCT POLYESTER COMPOSITIONS
Takeo Hokama, Chicago, Ill., assignor to Velsicol
Chemical Corporation, Chicago, Ill.
No Drawing. Filed Apr. 19, 1972, Ser. No. 245,630
Int. Cl. C08g 39/10
U.S. Cl. 260—860                                10 Claims

ABSTRACT OF THE DISCLOSURE

This invention discloses a polyester composition comprising from about 20 to about 50 parts by weight of a first linear polyester which comprises from about 10 to about 40 mole percent of an adduct of trans-piperylene and maleic acid or its anhydride, from about 10 to about 40 mole percent of dicarboxylic compound selected from the group consisting of maleic acid, maleic anhydride, fumaric acid and mixtures thereof, and from about 50 to about 70 mole percent glycol; and from about 50 to about 80 parts by weight of a second unsaturated polyester.

---

This invention relates to blended polyester compositions wherein the blend retains the properties of one of the individual components. More specifically this invention relates to unsaturated air drying blended polyester compositions containing as an essential component a linear polyester comprising an adduct of trans-piperylene and maleic acid or anhydride, an unsaturated dicarboxylic compound and glycol.

A variety of polyesters useful as protective coatings have been disclosed in the art. These polyesters are typically the reaction product of an unsaturated dicarboxylic acid or anhydride and an aliphatic polyol. Such unsaturated polyesters can react with olefinic monomers to form polymerized, insoluble and infusible cross-linked products. The properties of the polyesters will vary greatly with the particular dicarboxylic compound, polyol and olefinic monomer used. In many instances a combination of different dicarboxylic compounds as well as polyols are used in an attempt to impart desirable properties to the polyester.

While the tailoring of physical properties by incorporating a variety of different materials into the backbone of the polyester has been often successful, similar results have not been obtained by the physical blending of polyesters. In most instances it has been found that blending two or more different polyesters merely results in the degeneration of properties of the individual components.

Recently much effort has been expended in preparing polyesters having air drying properties. These polyesters when reacted with an olefinic monomer cure in thin films at ambient temperatures and in the presence of air to a hard nontacky surface. Ordinarily polyestermonomer compositions will not cure satisfactorily in thin sections, such as coatings, in the presence of air. Atmospheric oxygen has a retarding effect on the free radical polymerization mechanisms by which these compositions cure. After curing in the presence of air the undersurface of the film may be tough and strong, but the surface is tacky and susceptible to attack by solvents.

Several polyesters which possess air drying properties to varying degrees are known. The more successful among these are polyesters based on tetrahydrophthalic anhydride as well as those based on an isoprene-maleic anhydride adduct. These polyesters, however, when blended with a second polyester result in a composition whose air drying properties rapidly degenerate as the proportion of the second polyester increases. As previously indicated this effect is in accord with the typical results obtained upon blending polyesters.

It has now surprisingly been found that when a particular polyester prepared from an adduct of transpiperylene and maleic acid or anhydride is blended with other polyesters the air drying properties of the particular polyester are retained in the blend. Moreover, it has been found that such blends still possess excellent air drying properties while containing as little as 20 to 50 weight percent of the polyester based on the trans-piperylene and maleic acid or anhydride adduct.

Accordingly, one embodiment of the present invention resides in an air drying blended polyester composition comprising from about 20 to about 50 parts by weight of a first linear polyester which comprises from about 10 to about 40 mole percent of an adduct of trans-piperylene and maleic acid or its anhydride; from about 10 to about 40 mole percent of dicarboxylic compound selected from the group consisting of maleic acid, maleic anhydride, fumaric acid and mixtures thereof; and from about 50 to about 70 mole percent glycol; and from about 50 to 80 parts of a second unsaturated polyester.

In a preferred embodiment of the present invention the first polyester comprises from about 15 to about 30 mole percent of an adduct of trans-piperylene and maleic acid or its anhydride, from about 20 to about 35 mole percent of dicarboxylic compound selected from the group consisting of maleic acid, maleic anhydride, fumaric acid and mixtures thereof, and from about 50 to about 60 mole percent glycol.

The adduct of trans-piperylene and maleic anhydride i.e. cis-3-methyl-4-cyclohexene-cis,cis - 1,2 - dicarboxylic anhydride M.P. 63 to 65° C. imparts the air drying properties to the polyester prepared therefrom. This material will hereinafter be referred to as beta-PMAA.

The preparation of beta-PMAA can be carried out by the following produre. Maleic anhydride and a small amount of an inert aromatic hydrocarbon solvent (about 10 to 30% by weight based on the maleic anhydride), such as toluene or xylene, are charged into a suitable reaction vessel and are heated until the mixture becomes homogeneous. At least an equimolar amount of transpiperylene is then slowly added to the reaction vessel with vigorous stirring and sufficient cooling to maintain the reaction temperature between about 40 and about 80° C. After the addition is completed further stirring and maintaining of the temperature for a period of up to about 3 hours can be desirable to insure the completion of the reaction. After this time the adduct of trans-piperylene and maleic anhydride can be recovered in excellent yields and high purity as a white solid having a melting point of 63 to 65° C. upon distillation of the reaction products under reduced pressure.

The beta-PMAA is thermodynamically less stable than certain of its stereoisomers. Consequently, care must be taken during distillation so as to prevent undesired isomerization of its carboxyl groups or rearrangement of its unsaturation. In particular, during distillation, the system must be kept free of acids, bases and transition metal salts.

The linear beta-PMAA polyester of the present invention can also include one or more diacid, anhydride or other ester forming derivatives of dicarboxylic acids in addition to the required unsaturated dicarboxylic compounds. These compounds can be selected from the group consisting of aliphatic, cycloaliphatic and aromatic dicarboxylic acids and anhydrides. The compounds can be unsubstituted or substituted wherein the substituents are substantially inert to polymerization, such as halogen, nitro or cyano. Exemplary of suitable acids and anhydrides are endic, chlorendic, phthalic, isophthalic, carbic, hydrogenated carbic, succinic, adipic and tetrachloro and tetrabromobenzene dicarboxylic acids. These compounds can comprise from about 5 to about 60 mole percent of the total dicarboxylic component used in making the essentially linear polyester.

Glycol is required in the linear beta-PMAA polyester of the present invention. The glycol can be selected from the group consisting of ethylene glycol, di-, tri-, tetra-, and higher -ethylene glycols such as polyethylene glycol, propylene glycol, trimethylene glycol, polypropylene glycol, dipropylene glycol, 2,2-dimethyl-1,3-propane-diol, 1,3-butylene glycol, hydrogenated bisphenol A, alkoxylated bisphenol A and the like. As previously indicated the amount of glycol used to prepare the polyesters of this invention ranges from about 50 to about 70 mole percent.

The linear polyester of the present invention can be prepared readily using one of the standard procedures known to the art such as the fusion cook or solvent methods. For example the ingredients can be combined with a quantity of an inert solvent such as xylene and heated to reflux in a nitrogen atmosphere. The water formed in the reaction is azeotroped with the inert solvent and removed by means known to the art. The inert solvent remaining in the reaction mixture at or near the end of the reaction can be removed by heating by sparging with an inert gas or by the application of vacuum. The reaction is preferably continued until a low acid number, such as about 40 or less, and more preferably about 35 or less, is obtained. Although the resulting polyester can be isolated as such, it is preferred to prepare the composition in the form in which the polyester is to be used and transport or store the compositions in that form.

The second polyester with which the beta-PMAA based polyester can be combined to form the blended compositions of the present invention can be any of the well known unsaturated polyesters capable of copolymerization with monomeric ethylene derivatives by free radical polymerization.

These polyesters can comprise from about 10 to about 50 mole percent of an ethylenically reactive dicarboxylic compound selected from the group consisting of maleic acid, maleic anhydride, fumaric acid and mixtures thereof; from 0 to about 40 mole percent of an ethylenically unreactive dicarboxylic compound selected from the group consisting of phthalic acid, phthalic anhydride, isophthalic acid, terephthalic acid, tetrahydrophthalic acid, tetrahydrophthalic anhydride, tetrabromophthalic acid, tetrabromophthalic anhydride, tetrachlorophthalic acid, tetrachlorophthalic anhydride, chlorendic anhydride, endic anhydride and the adduct of isoprene and maleic anhydride; and from about 50 to about 70 mole percent of glycol.

The glycol of the second polyester of the present invention can be selected from the same group previously set forth for use in the beta-PMAA polyester of the present invention.

The blended polyester compositions of this invention are simply prepared by mixing the first polyester with the second polyester until a homogeneous blend is obtained. In some instances it may be advantageous to carry out the mixing at elevated temperatures to facilitate dissolution.

A further useful composition of blended polyester composition of this invention is a liquid, hardenable, polymerizable mixture of said blended polyester composition and at least one monomeric ethylene derivative copolymerizable by free radical addition polymerization with the unsaturation in the first and second polyester of the blended polyester composition. Monomeric ethylene derivatives copolymerizable with unsaturation in polyesters via free radical addition polymerization and their use are known to the art and are exemplified by those of the styrene, vinyl ester and acrylate type. The styrene type ethylene derivatives can be described by the following structural formula:

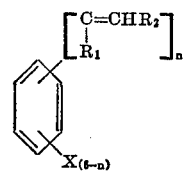

wherein $R_1$ and $R_2$ are independently selected from the group consisting of hydrogen and alkyl; $n$ is an integer greater than zero and less than six, preferably from one to two; and each X is independently selected from the group consisting of hydrogen, alkyl and halogen. The acrylic monomers can be described by the following structural formula

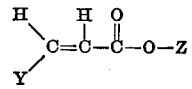

wherein Y and Z are independently selected from the group consisting of hydrogen and alkyl. The alkyl groups in the above formulas preferably contain from one to ten carbon atoms.

The preferred ethylene derivatives for copolymerization with the polyester are styrene, alpha-methylstyrene, vinyl toluenes, chlorostyrenes, vinyl acetate, vinyl benzoate, methyl acrylate, ethyl acrylate, methyl methacrylate, butyl acrylate and mixtures thereof.

Other ethylene derivatives can be used in place of or with those described above. Exemplary of these are: diacetone acrylamide, alpha unsaturated vinyl ketones such as vinyl methyl ketone, alpha unsaturated vinyl sulfones as divinyl sulfone; vinyl esters of saturated and unsaturated mono- and polycarboxylic acids such as vinyl propionate and succinic acid divinyl esters; N-vinyl lactams such as N-vinyl pyrrolidone and N-vinyl caprolactam; and vinyl ethers of mono- and polyhydro compounds such as isobutyl vinyl ether and butane diol-1,4-divinyl ether.

The liquid, hardenable, polymerizable mixture comprises from about 20 to about 80% by weight of the blended polyester composition and from about 20 to about 80% by weight of the ethylene derivatives or ethylene derivative-acrylate mixture.

The polymerizable mixtures may be stabilized by adding the usual polymerization inhibitors ot prevent gelation and increase the storage or shelf like of the mixture. Suitable inhibitors are for example mono- and polyhydric phenols such as hydroquinone, benzoquinone, resorcinol, pyrocatechol and the like. Only a small amount of inhibitor is required such as from about 0.005 to about 0.1% based on the weight of the mixture. It is preferable to add from about 0.01 to about 0.03% inhibitor.

The polymerizable mixtures described above can be stored for long periods of time without appreciable polymerization. In order to utilize the mixtures polymerization is initiated by the addition of catalysts, particularly the peroxide and hydroperoxide catalysts. Examples of especially suitable catalysts are methyl ethyl ketone peroxide, cyclohexanone peroxide, t-butyl hydroperoxide, benzoyl peroxide, lauroyl peroxide, t-butyl perbenzoate, t-butyl permaleate and di-t-butyl peroxide. Other catalysts which can be used to initiate or accelerate the polymerization reaction are the azo compounds such as azo-bis-isobutyronitrile and azo-bis-isobutyric acid dibutyl ester, and redox systems consisting of a peroxide and a tertiary amine. A small amount of catalyst such as for example between 0.2 and 3.0 percent by weight of the polymerizable mixture has been found to be sufficient.

In conjunction with the catalysts, an accelerator or promoter, such as the metal driers commonly used in polyester solutions to enhance curing i.e., crosslinking, at ambient temperatures can be used in the polymerizable mixture. The naphthenates of the metals iron, cobalt, nickel, manganese, chromium, lead, vanadium, zinc, zirconium, cerium, aluminum and calcium are especially suitable. In addition the resinates, octoates or linoleates of metal compounds soluble in the polymerizable mixture may be used. Often it is desirable to add mixtures of the various driers to obtain particular properties. The driers are normally used in an amount between 0.01 and 1.0 percent of the metal based on the weight of the polymerizable mixture.

The polymerization mixtures described above are particularly useful in coating substrates, in the presence of oxygen, particularly in the presence of air, with a coating having a hard, dry surface within less than about 2 hours. Coating can be accomplished by applying to the substrate the liquid hardenable polymerizable mixture and a free radical catalyst therefore at room temperature until the surface of the coating is dry. The polymerizable mixture also can be used to coat a substrate in the presence of oxygen with a coating having a hard, dry surface in less than 15 minutes by applying the mixture and the free radical catalyst as above and then heating the coated substrate to a temperature above about 50° C. and preferably below about 150° C. until the surface of the coating is dry.

The preparation of the beta-PMAA polyesters are more specifically illustrated in the following examples.

EXAMPLE 1

Preparation of a polyester of beta-PMAA

Beta-PMAA (0.08 mole), diethylene glycol (1.7 mols), hydrogenated bisphenol A (1.1 mols) and toluene (50 ml.) were charged into a glass reaction flask equipped with a dropping funnel, stirrer, thermometer and a Snyder column connected to a Dean-Stark trap and Friedrich condenser. Both the dropping funnel and the condenser was connected to nitrogen lines following the maintenance of an inert atmosphere over the reaction mixture. The reaction flask was then flushed with nitrogen and the reaction mixture was heated to a temperature of 210° C. with stirring. The reaction temperature was maintained by the addition of toluene and adjusting the amount of refluxing toluene. After five hours at 210° C. the reaction mixture was cooled to approximately 60° C. and sampled for its acid value. An acid value of 26.6 was observed. Fumaric acid (1.9 mols) was charged into the reaction flask and the mixture was heated at 195° C. for a period of about 3 hours. After this time the reaction mixture was stripped of toluene, unreacted starting materials and half esters. The reaction mixture was then cooled to yield the desired polyester having an acid value of 21.6 and hydroquinone inhibitor (2000 p.p.m.) was added thereto. Styrene monomer was then added to the polyester at a temperature of about 100° C. in an amount sufficient to result in a 60 percent solution of the polyester in styrene.

EXAMPLE 2

Preparation of a polyester of beta-PMAA

Beta-PMAA (0.6 moles), fumaric acid (1.4 moles), hydrogenated bisphenol A (0.26 moles) and diethylene glycol (1.84 moles) were charged into a glass reaction flask equipped with a mechanical stirrer, internal thermometer, gas inlet tube and reflux condenser provided with a Dean-Stark trap. Nitrogen gas was passed through the vapor space of the flask to exclude air and a blanket of the gas was maintained over the reaction mixture during the reaction. The contents of the flask were stirred and heated at reflux (190–200° C.). The water produced by the reaction was removed from the azeotrope and collected in the Dean-Stark trap. The mixture was heated at reflux until the acid number of the polyester was 36.4. After this time the reaction mixture was stripped of toluene, unreacted starting materials and half esters.

A variety of air drying blended polyester compositions in accordance with the present invention were prepared. In each of these compositions a polyester prepared from beta-PMAA was blended with a second unsaturated polyester. The composition of the individual polyester is as follows:

| | Mole ratio of components |
|---|---|
| Polyester I | |
| Beta-PMAA | 0.30 |
| Fumaric acid | 0.70 |
| Diethylene glycol | 1.03 |
| Polyester II | |
| Beta PMAA | 0.50 |
| Fumaric acid | 0.50 |
| Diethylene glycol | 1.03 |
| Polyester III | |
| Phthalic anhydride | 0.50 |
| Maleic acid | 0.50 |
| Diethylene glycol | 0.50 |
| Propylene glycol | 0.55 |
| Polyester IV | |
| Chlorendic anhydride | 0.50 |
| Maleic anhydride | 0.50 |
| Diethylene glycol | 0.50 |
| Propylene glycol | 0.55 |
| Polyester V | |
| Isoprene maleic anhydride adduct | 0.50 |
| Fumaric acid | 0.50 |
| Diethylene glycol | 1.03 |
| Polyester VI | |
| Tetrahydrophthalic anhydride | 0.50 |
| Fumaric acid | 0.50 |
| Diethylene glycol | 1.03 |

As previously mentioned the above-described individual polyesters were blended to form the air drying blended polyester compositions of this invention. In addition to compositions falling within the scope of the present invention some compositions outside the scope of the invention were prepared for comparative purposes. The compositions outside the scope of the invention either do not contain the essential polyester prepared from beta-PMAA or do not contain this polyester in the required proportion.

The following table sets forth the air drying properties of 1.5 mil films of the various polyesters and blends when combined with styrene in a 60:40 ratio by weight to form a polymerizable mixture. The air drying properties are expressed in terms of the press free time of the films. The press free time is determined by drawing a 1.5 mil film of the polymerizable mixture catalyzed with methyl ethyl ketone (1.5% by weight) and cobalt naphthenate (1.0% by weight) onto a steel panel and measuring the elapsed time until a cotton ball can be pressed onto the surface of the film and brushed off the film without having cotton fibers adhering to the surface.

TABLE I

| Polyester blend | Weight ratio | Press free time (minutes) |
|---|---|---|
| Polyester I/polyester III | 100:0 | 60 |
| Do | 75:25 | 115 |
| Do | 50:50 | 130 |
| Do | 25:75 | 140 |
| Do | 0:100 | 300 |
| Polyester II/polyester III | 100:0 | 60 |
| Do | 75:25 | 95 |
| Do | 50:50 | 100 |
| Do | 25:75 | 100 |
| Do | 0:100 | >300 |
| Polyester I/polyester IV | 100:0 | 60 |
| Do | 75:25 | 55 |
| Do | 50:50 | 55 |
| Do | 25:75 | 65 |
| Do | 0:100 | 120 |

TABLE I—Continued

| Polyester blend | Weight ratio | Press free time (minutes) |
| --- | --- | --- |
| Polyester II/polyester IV | 100:0 | 60 |
| Do | 75:25 | 55 |
| Do | 50:50 | 60 |
| Do | 25:75 | 75 |
| Do | 0:100 | 120 |
| Polyester V/polyester III | 100:0 | 100 |
| Do | 75:25 | 120 |
| Do | 50:50 | 135 |
| Do | 25:75 | 200 |
| Do | 0:100 | >300 |
| Polyester VI/polyester III | 100:0 | 115 |
| Do | 75:25 | 150 |
| Do | 50:50 | 200 |
| Do | 25:75 | >300 |
| Do | 0:100 | >300 |
| Polyester V/polyester IV | 100:0 | 100 |
| Do | 75:25 | 90 |
| Do | 50:50 | 90 |
| Do | 25:75 | 95 |
| Do | 0:100 | 120 |
| Polyester VI/polyester IV | 100:0 | 115 |
| Do | 75:25 | 115 |
| Do | 50:50 | 115 |
| Do | 25:75 | 120 |
| Do | 0:100 | 120 |

I claim:

1. An air drying blended polyester composition comprising from about 20 to about 50 parts by weight of a first linear polyester which comprises from about 10 to about 40 mole percent of an adduct of trans-piperylene and maleic acid or its anhydride; from about 10 to about 40 mole percent of dicarboxylic compound selected from the group consisting of maleic acid, maleic anhydride, fumaric acid and mixtures thereof; and from about 50 to about 70 mole percent glycol; and from about 50 to about 80 parts by weight of a second unsaturated polyester.

2. The blended polyester composition of claim 1 wherein the first polyester comprises from about 15 to about 30 mole percent of an adduct of trans-piperylene and maleic acid or anhydride; from about 20 to about 35 mole percent of dicarboxylic compound selected from the group consisting of maleic acid, maleic anhydride, fumaric acid and mixtures thereof; and from about 50 to about 60 mole percent glycol.

3. The blended polyester composition of claim 1 wherein the second polyester comprises from about 10 to about 50 mole percent of ethylenically reactive dicarboxylic compound selected from the group consisting of maleic acid, maleic anhydride, fumaric acid and mixtures thereof; from 0 to about 40 mole percent of an ethylenically unreactive dicarboxylic compound selected from the group consisting of phthalic acid, phthalic anhydride, isophthalic, acid, terephthalic acid, tetrahydrophthalic acid, tetrahydrophthalic anhydride, tetrabromophthalic acid, tetrabromophthalic anhydride, tetrachlorophthalic acid, tetrachlorophthalic anhydride, chlorendic anhydride, endic anhydride and the adduct of isoprene and maleic anhydride, and from about 50 to about 70 mole percent glycol.

4. The blended polyester composition of claim 1 wherein the glycol of the first polyester and of the second polyester is independently selected from the group consisting of ethylene glycol, diethylene glycol, triethylene glycol, polyethylene glycol, propylene glycol, trimethylene glycol, polypropylene glycol, dipropylene glycol, 2,2 dimethyl-1,3-propane diol, 1,3-butylene glycol, hydrogenated bisphenol A and alkoxylated bisphenol A.

5. The blended polyester composition of claim 1 wherein the first polyester comprises an adduct of transpiperylene and maleic anhydride, fumaric acid and diethylene glycol.

6. The blended polyester composition of claim 1 wherein the first polyester comprises an adduct of transpiperylene and maleic anhydride, fumaric acid and diethylene glycol and the second polyester comprises phthalic anhydride, maleic anhydride, diethylene glycol and propylene glycol.

7. A liquid, hardenable, polymerizable mixture comprising the blended polyester composition of claim 1 and at least one monomeric ethylene derivative copolymerizable by free radical addition polymerization with the unsaturation in the first and second polyester of the blended polyester composition.

8. The polymerizable mixture of claim 7 wherein the ethylene derivative is selected from the group consisting of styrene, alpha-methylstyrene, vinyl toluene, chlorostyrene, vinyl acetate, vinyl benzoate, methyl acrylate, ethyl acrylate, methyl methacrylate, butyl acrylate.

9. The polymerizable mixture of claim 7 wherein the blended polyester composition comprises from about 20 to about 80 percent by weight and the ethylene derivative comprises from about 20 to about 80 percent by weight.

10. The polymerizable mixture of claim 7 wherein the ethylene derivative is styrene.

References Cited

UNITED STATES PATENTS 3,663,658   5/1972   Scardiglia _____ 260—869
3,511,687   5/1970   Keyl et al. _____ 204—159.19

WILLIAM H. SHORT, Primary Examiner

E. WOODBERRY, Assistant Examiner

U.S. Cl. X.R.

117—161 K; 260—75 UA, 861

PO-1050
(5/69)

UNITED STATES PATENT OFFICE
CERTIFICATE OF CORRECTION

Patent No. 3,795,716      Dated March 5, 1974

Inventor(s) Takeo Hotaino

It is certified that error appears in the above-identified patent and that said Letters Patent are hereby corrected as shown below:

In Column 5, line 37 for "0.08" read -- 0.80 --.

In Column 5, line 58 for "2000" read -- 200 --.

Signed and sealed this 1st day of October 1974.

(SEAL)
Attest:

McCOY M. GIBSON JR.
Attesting Officer

C. MARSHALL DANN
Commissioner of Patents